United States Patent
Raghavan et al.

(10) Patent No.: US 9,665,241 B2
(45) Date of Patent: May 30, 2017

(54) MEDIA CONTENT SEARCH SYSTEMS AND METHODS

(71) Applicant: Verizon Patent and Licensing Inc., Arlington, VA (US)

(72) Inventors: Senthil K. Raghavan, Lewisville, TX (US); Sankar Ram Dhanabalan, Irving, TX (US); George M. Higa, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 288 days.

(21) Appl. No.: 14/320,545

(22) Filed: Jun. 30, 2014

(65) Prior Publication Data

US 2015/0379048 A1 Dec. 31, 2015

(51) Int. Cl.
*G06F 17/30* (2006.01)
*G06F 3/0481* (2013.01)
*G06F 3/0482* (2013.01)

(52) U.S. Cl.
CPC ........ *G06F 3/04817* (2013.01); *G06F 3/0482* (2013.01); *G06F 17/30038* (2013.01)

(58) Field of Classification Search
CPC ......... G06F 17/30277; G06F 17/30864; G06F 3/0484; G06F 3/0482; G06F 3/04817; G06F 3/0485; G06F 3/0481; G06F 17/30038; G06F 17/30; H04L 51/32; H04N 21/458; H04N 21/482; H04N 21/44012; H04N 7/1733; H04N 21/20; H04N 21/26258; H04N 21/26283; H04N 21/4668; H04N 21/44218; H04N 21/4532; H04N 21/4667; H04N 21/4826; H04N 41/458

See application file for complete search history.

(56) References Cited

U.S. PATENT DOCUMENTS

| | | | |
|---|---|---|---|
| 6,973,663 B1 | 12/2005 | Brown et al. | |
| 2006/0184410 A1* | 8/2006 | Ramamurthy | G06Q 10/10 706/8 |
| 2008/0126303 A1* | 5/2008 | Park | G06F 17/30828 707/E17.014 |

(Continued)

OTHER PUBLICATIONS

Nalin Sharda Computer Science and Mathematics Victoria University—"Creating Innovative New Media Programs: Need, Challenges, and Development Framework"—Published in: Proceeding Emme '07 Proceedings of the international workshop on Educational multimedia and multimedia education—pp. 77-86.*

(Continued)

*Primary Examiner* — Anh Ly

(57) ABSTRACT

An exemplary method includes a media content search system providing a media content search creation tool in a graphical user interface, detecting a user-submission of one or more user-selectable graphical objects representing one or more media programs to the media content search creation tool in the graphical user interface, and generating a set of media content search parameters based on the one or more media programs represented by the one or more user-selectable graphical objects submitted to the media content search creation tool. Corresponding systems and methods are also described.

21 Claims, 12 Drawing Sheets

(56) References Cited

U.S. PATENT DOCUMENTS

| | | | |
|---|---|---|---|
| 2009/0165045 A1* | 6/2009 | Stallings | G06F 3/0482 725/39 |
| 2009/0327939 A1* | 12/2009 | Johns | G11B 27/34 715/765 |
| 2010/0169829 A1* | 7/2010 | Stallings | H04N 21/4331 715/810 |
| 2010/0293190 A1* | 11/2010 | Kaiser | G06F 3/048 707/769 |
| 2010/0306811 A1* | 12/2010 | Adimatyam | H04N 21/482 725/110 |
| 2010/0332527 A1* | 12/2010 | Wang | G06F 17/30781 707/769 |
| 2010/0333025 A1* | 12/2010 | Roberts | G06F 3/0482 715/823 |
| 2010/0333139 A1* | 12/2010 | Busse | H04N 5/44543 725/44 |
| 2011/0145428 A1* | 6/2011 | Wei | G06F 3/0481 709/231 |
| 2011/0246937 A1* | 10/2011 | Roberts | G11B 27/034 715/810 |
| 2011/0289317 A1* | 11/2011 | Darapu | H04N 21/25816 707/769 |
| 2012/0060188 A1* | 3/2012 | Stallings | H04N 21/42209 725/44 |
| 2012/0159372 A1* | 6/2012 | Stallings | H04N 21/42208 715/773 |
| 2012/0311444 A1* | 12/2012 | Chaudhri | G06F 3/04883 715/716 |
| 2013/0152139 A1* | 6/2013 | Davis | H04N 21/482 725/61 |
| 2013/0346563 A1* | 12/2013 | Huang | H04L 67/10 709/219 |
| 2014/0074716 A1* | 3/2014 | Ni | G06F 21/51 705/44 |
| 2014/0164507 A1* | 6/2014 | Tesch | H04L 51/10 709/204 |
| 2014/0280048 A1* | 9/2014 | Bumgarner | G06F 3/0482 707/722 |
| 2015/0067505 A1* | 3/2015 | Metcalf | G06F 17/3089 715/716 |
| 2015/0081690 A1* | 3/2015 | Arom | G06F 17/30749 707/728 |
| 2015/0186511 A1* | 7/2015 | Trollope | G06F 17/30755 707/769 |

OTHER PUBLICATIONS

Nevzat Hurkan Balkir et al. "A Graphical Query Language: Visual and Its Query Processing"—IEEE Transactions on Knowledge and Data Engineering, vol. 14, No. 5, Sep./Oct. 2002—pp. 955-978.*

* cited by examiner

MEDIA CONTENT SEARCH SYSTEMS AND METHODS

BACKGROUND INFORMATION

A media service, such as a subscriber television service, provides end users of the service with access to media content, typically by way of a graphical user interface ("GUI"). A common feature included in such a GUI is a keyword search feature that allows an end user to search for media content by entering text input into the keyword search feature.

Unfortunately, a keyword search may seem frustrating and/or inefficient to an end user. For example, the end user may lack necessary information to perform a keyword search (e.g., the end user may not remember the name of a particular actor he or she would like to enter as a keyword search term, etc.), and/or may experience difficulty or inconvenience entering keywords (e.g., on a small touch screen keypad of a mobile device such as a smartphone).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media content search systems and methods are described herein. In certain embodiments, exemplary systems and methods described herein may provide a media content search creation tool in a graphical user interface ("GUI"), detect a submission, by a user, of one or more user-selectable graphical objects representing one or more media programs to the media content search creation tool in the GUI, and generate a set of media content search parameters based on the one or more media programs represented by the one or more user-selectable graphical objects submitted to the media content search creation tool. The media content search creation tool may include one or more features configured to facilitate visual definition of a media content search by a user. In such examples, the media content search creation tool may be referred to as a "visual media-content-search-creation tool."

Exemplary media content search systems and methods described herein may provide a user with an intuitive and/or convenient way to visually define a search for media content. For example, a user may submit one or more graphical objects (e.g., one or more cover art images) representing one or more media programs to a media content search creation tool provided in a GUI (e.g., by using intuitive touch gestures on a touch screen of device such as a smartphone, tablet device, etc.). The exemplary media content search systems and methods may detect the submission of the one or more graphical objects to the media content search creation tool and may generate a search for media content related to the one or more media programs represented by the one or more graphical objects submitted to the media content search creation tool, in any of the ways described herein. These and/or other benefits or advantages of exemplary systems and methods will be made apparent herein. Exemplary media content search systems, methods, and devices will now be described in reference to the drawings.

Figure 1:
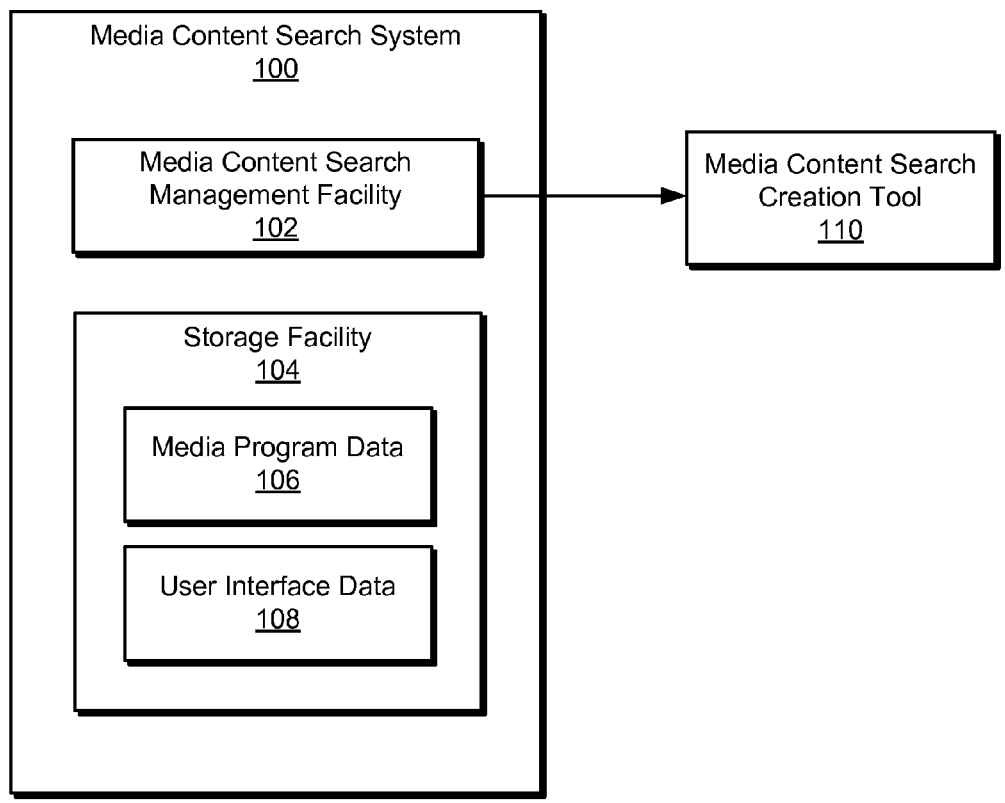
FIG. 1 illustrates an exemplary media content search system according to principles described herein.

FIG. 1 illustrates an exemplary media content search system 100 ("system 100"). As shown, system 100 may include, without limitation, a media content search management facility 102 ("management facility 102") and a storage facility 104 selectively and communicatively coupled to one another. Any suitable communication technologies, including any of the communication technologies mentioned herein, may be employed to facilitate communications between facilities 102 and 104.

Although facilities 102 and 104 are shown to be discrete facilities in FIG. 1, facilities 102 and 104 may be combined into fewer facilities, such as into a single facility, or divided into more facilities as may serve a particular implementation. Additionally or alternatively, one or more of the facilities 102 and 104 may be omitted from and external to system 100 in other implementations. For example, storage facility 104 may be external of and communicatively coupled to system 100 in certain alternative implementations. Facilities 102 and 104 will now be described in more detail.

Storage facility 104 may store media program data 106, which may be representative of one or more media programs that are provided by a media content distribution service for access by an end user of the service. As used herein, the term "media content" may refer to any form of media that may be processed by a consumer electronics device for presentation to a user of the device. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may experience with a consumer electronics device. Such media programs may be accessed and/or processed (e.g., played back) by an appropriately configured consumer electronics device (e.g., a set-top box device, television device, desktop computer, laptop computer, tablet device, and/or other consumer electronics device) for presentation to the user.

Media program data 106 may additionally or alternatively include media program metadata (e.g., without including actual media program content). The media program metadata may be accessed from any suitable source (e.g., a third-party provider) and may represent any information about media programs.

Storage facility 104 may also store user interface data 108, which may include any data used and/or generated by management facility 102 to provide a user interface, such as any of the exemplary GUI views described herein. Storage facility 104 may maintain additional or alternative data as may serve a particular implementation.

Management facility 102 may provide a GUI. For example, management facility 102 may provide one or more views of a GUI, including any of the exemplary GUI views described herein, for display on a display screen of a display device. Management facility 102 may additionally provide a media content search creation tool 110 within the GUI. The media content search creation tool 110 may be configured to facilitate input by a user to visually define a media content search. Such user input may include input provided by a user to submit one or more graphical objects (e.g., cover art images) representing one or more media programs to the media content search creation tool 110. Examples of the media content search creation tool 110 and submissions of graphical objects representing media programs to the media content search creation tool 110 are described herein.

Management facility 102 may detect a submission of one or more graphical objects representing one or more media programs to the media content search creation tool 110 and to generate media content search parameters based on the one or more media programs represented by the one or more graphical objects submitted to the media content search creation tool 110. For example, a user may provide input to submit one or more cover art images representing one or more media programs to the media content search creation tool 110, and management facility 102 may generate a set of media content search parameters based on the one or more media programs represented by the one or more submitted cover art images. Management facility 102 may generate a set of media content search parameters based on one or more media programs in any suitable way, including in any of the ways described herein.

Management facility 102 may submit a generated set of media content search parameters to a search engine that is configured to use the set of media content search parameters to search for media programs related to the set of media content search parameters. The search engine may return, and management facility 102 may receive, data representative of results of the search, which may include one or more media programs identified by the search engine as being related to the set of media content search parameters. Management facility 102 may provide, for display on a display screen, a graphical representation of the search results data received from the search engine.

Figure 2:
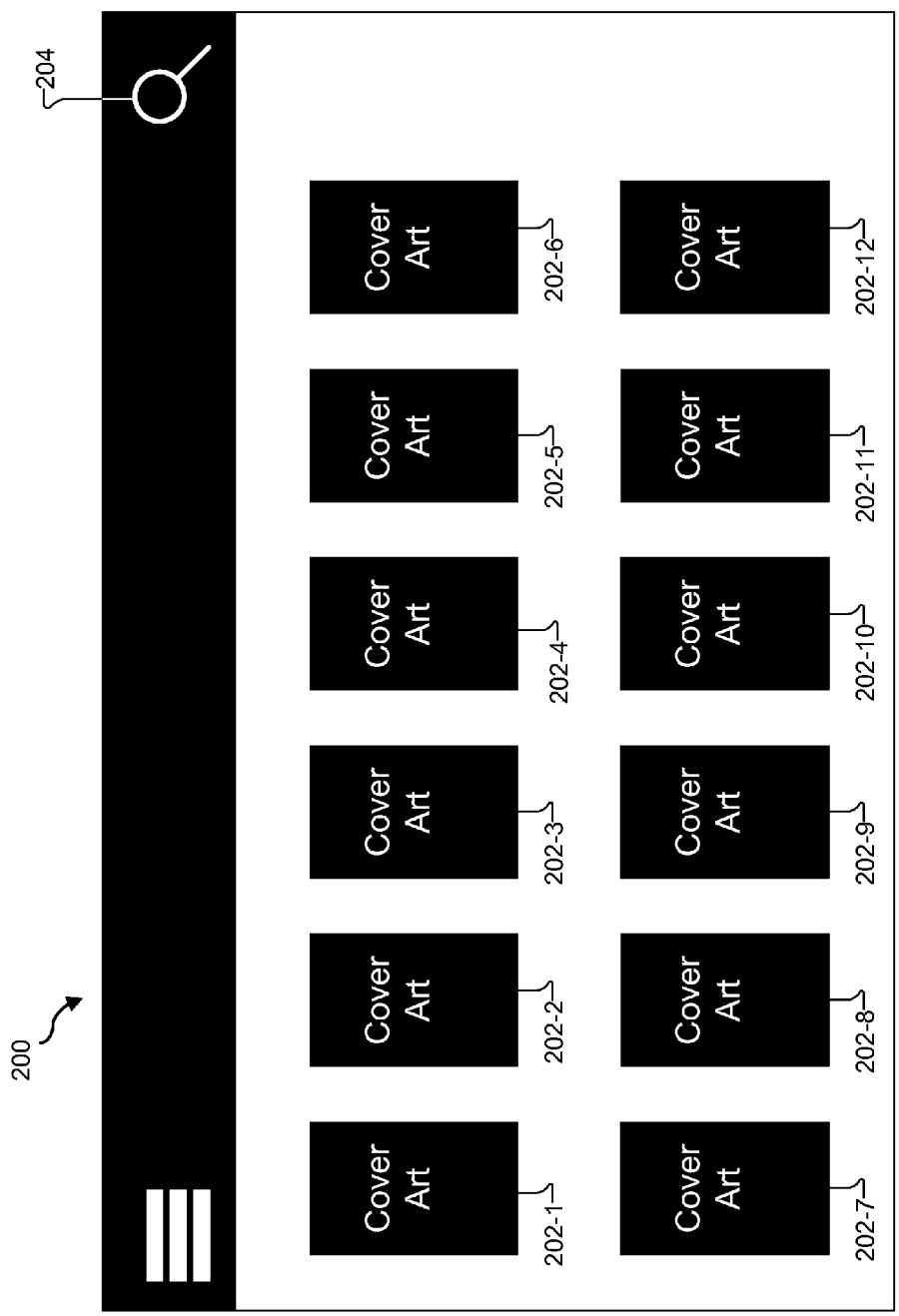
FIGS. 2-8 illustrate exemplary graphical user interface views that may be displayed on a display screen according to principles described herein.

FIG. 2 illustrates an exemplary GUI view 200 that may be provided by management facility 102 for display on a display screen of a display device. GUI view 200 may include one or more user-selectable graphical objects 202 respectively representing one or more media programs. In certain examples, graphical objects 202 may include cover art images representing media programs. Graphical objects 202 may be arranged, within a GUI view such as GUI view 200, to form one or more menus and/or sub-menus of user-selectable options. For example, graphical objects 202 may be arranged as a menu of user-selectable media programs in a media program browse view of a GUI. Graphical objects 202 may be selectable by a user to initiate one or more operations related to media programs represented by the graphical objects 202. For example, a user may provide input to select a particular graphical object 202 that represents a particular media program in order to initiate a playback of the media program or to launch a display of an information or access view for the media program.

As previously mentioned, management facility 102 may provide a media content search creation tool within a GUI. In certain examples, the media content search creation tool may include a media content search creation tool icon ("search tool icon") configured to facilitate user submission of input to the media content search creation tool to define a search for media content (e.g., one or more media programs). For example, GUI view 200 shows an exemplary search tool icon 204 that may be configured to facilitate user submission of one or more graphical objects 202 as input to the media content search creation tool to visually define a search for related media content. Exemplary features and uses of the media content search creation tool will now be described.

Figure 3:
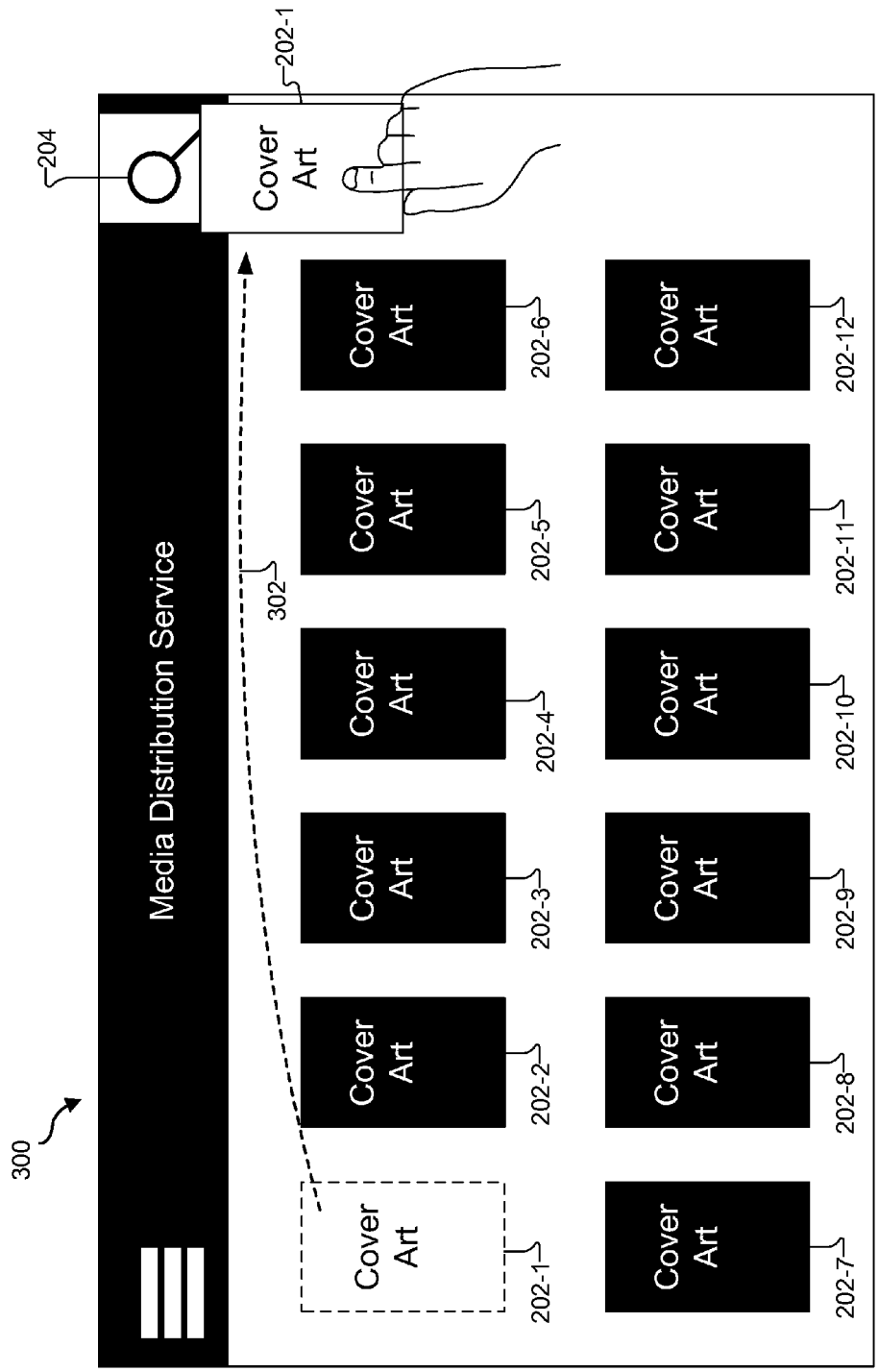

FIG. 3 illustrates an exemplary GUI view 300 that may be provided by management facility 102 for display on a display screen of a display device and with which a user may interact to submit one or more graphical objects 202 included in a menu of graphical objects 202 representative of media programs as input to a media content search creation tool to define a search for media content. For example, a user may submit a particular graphical object 202 to the media content search creation tool by providing an appropriate touch gesture on a touchscreen of a consumer electronics device, such as by dragging the graphical object 202 to the search tool icon 204. For example, as shown in FIG. 3, a user may use a drag-and-drop touch gesture to drag and drop graphical object 202-1 to the search tool icon 204, as illustrated by dashed line 302. By providing input to drag and drop graphical object 202-1 to search tool icon 204, a user effectively submits the media program represented by graphical object 202-1 as input to the media content search creation tool.

In this or a similar manner, one or more users may submit one or more graphical objects representing one or more media programs to the media content search creation tool in order to visually define a search. For example, a single user may submit one or more graphical objects representative of one or more media programs to the media content search creation tool as described herein. As another example, multiple users, such as a husband and wife, may contribute to defining a search by each submitting one or more graphical objects representative of one or more media programs to the media content search creation tool as described herein.

In response to a user submission of a graphical object representative of a media program to the media content search creation tool, management facility 102 may detect the user submission of the media program to the media content search creation tool and, in some embodiments, visually indicate the detected submission. Management facility 102 may visually indicate a detected submission of one or more media programs to the media content search creation tool in any suitable way. For example, management facility 102 may visually indicate a user submission of a media program represented by a graphical object to the media content search creation tool by highlighting the search tool icon 204 when a user drags the graphical object on top of the search tool icon 204 (e.g., when a user drags graphical object 202-1 on top of the search creation tool 204, as shown in FIG. 3).

Search tool icon 204 may be user selectable. Accordingly, a user may select the search tool icon 204 in any suitable way, such as by providing touch input on a touchscreen of a consumer electronics device to select the search tool icon 204. Management facility 102 may perform one or more operations in response to a user selection of search tool icon 204. For example, management facility 102 may provide one or more features, options, and/or information related to the media content search creation tool for presentation to the user.

Figure 4:
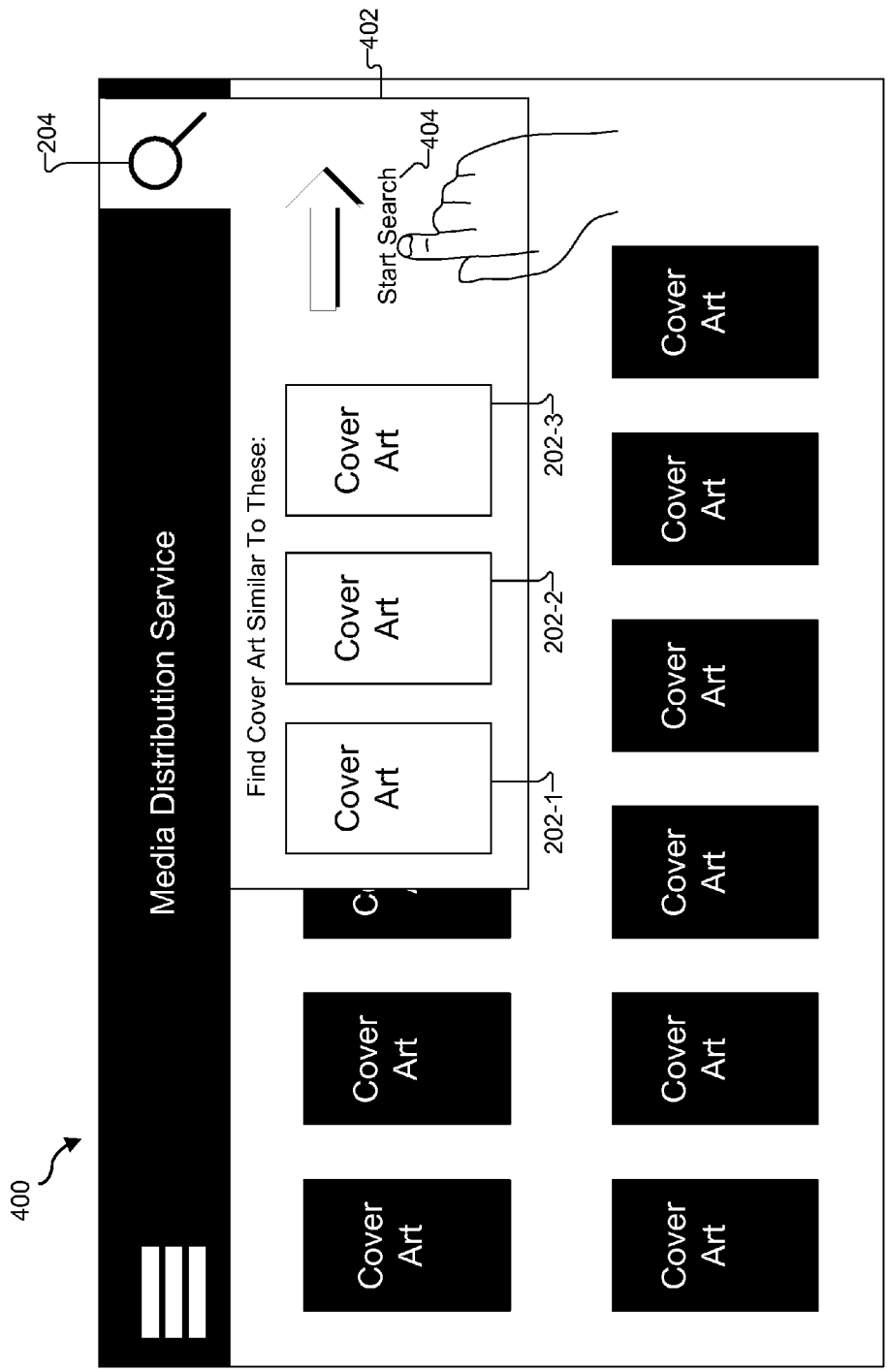

To illustrate, FIG. 4 shows an exemplary GUI view 400 in which a drop-down window 402 of the media content search creation tool is provided by management facility 102 for display. As shown, drop-down window 402 may include one or more graphical objects (e.g., graphical objects 202-1, 202-2, and 202-3) respectively representing one or more media programs that have been submitted to the media content search creation tool. While FIG. 4 shows drop-down window 402 to include graphical objects 202-1, 202-2, and 202-3 that have been submitted to the media content search creation tool, this is illustrative only. Graphical objects that have been submitted to the media content search creation tool may be represented in other ways in other examples. For example, in response to a user selection of the search tool icon 204, management facility 102 may launch a separate GUI view that includes GUI content indicating the media programs submitted to the media content search creation tool. In yet another example, management facility 102 may divide a GUI view into more than one portion, one portion used for displaying graphical objects representing media programs and another portion used to submit one or more of the media programs as input to the media content search creation tool. For example, management facility 102 may provide a split-screen GUI view where a menu of user-selectable graphical objects representing media programs and the media programs that have been submitted to the media content search creation tool are concurrently displayed on the same display screen.

As shown in FIG. 4, GUI view 400 may include a start-search option 404 configured to be selected by a user to initiate a search for media content (e.g., one or more media programs) related to (e.g., similar to) media programs submitted to the media content search creation tool. In some examples, start-search option 404 may be included within drop-down window 402, as shown in FIG. 4. In other examples, start-search option 404 may be displayed within a pop-up window overlaid on any of the other GUI views described herein, as a separate GUI view, or in any other suitable way.

In response to a user selection of start-search option 404, management facility 102 may perform one or more operations to initiate a search for media content related to one or more media programs submitted to the media content search tool. For example, management facility 102 may submit a set of media content search parameters to a search engine that is configured to use the set of media content search parameters to search for media programs related to the set of media content search parameters. The search engine may perform a search based on the set of media content search parameters and return data representative of results of the search, which results may include one or more media programs identified by the search engine as being related to the set of media content search parameters. Management facility 102 may receive the data representative of results of the search from the search engine and use the search results in any suitable way. For example, management facility 102 may provide, for display on a display screen, a graphical representation of the search results data received from the search engine.

Management facility 102 may generate a set of media content search parameters based on the one or more media programs at any suitable time. As an example, management facility 102 may generate a set of media content search parameters based on one or more media programs submitted to the media content search creation tool prior to an end user providing input to initiate a search (e.g., prior to the user selecting the start-search option 404). For instance, management facility 102 may generate the set of media content search parameters in response to a detection of a submission of the media programs to the media content search creation tool. Generation of the set of media content search parameters prior to initiating a search may speed up search performance time, such as by minimizing the amount of time between receipt of user input to initiate the search and receipt of search results. As another example, management facility 102 may generate a set of media content search parameters based on one or more media programs represented by one or more graphical objects submitted to the media content search creation tool in response to receiving input provided by a user to initiate a search (e.g., in response to a user selection of start-search option 404).

Management facility 102 may generate a set of media content search parameters based on one or more media programs submitted to the media content search creation tool in any suitable way. In some examples, management facility 102 may generate a set of media content search parameters based on predefined search parameter selection criteria. The predefined search parameter selection criteria may be provided for use by management facility 102 in any suitable manner and may include any suitable criteria configured for use by management facility 102 to generate a set of media content search parameters based on media programs submitted to the media content search creation tool. Accordingly, management facility 102 may access and use the predefined search parameter selection criteria to generate a set of media content search parameters.

In certain examples, predefined search parameter selection criteria may be provided for use by management facility 102 by a media content service provider that provides a media content distribution service (e.g., a media distribution service through which media content is distributed for access and/or consumption by an end user of the service and/or the media content search creation tool). In certain examples, the service provider may provide management facility 102 with predefined search parameter selection criteria that are configured to cause management facility 102 to generate media content search parameters that favor selection, for inclusion in media content search results, of media content distributed by way of the media content distribution service.

Additionally or alternatively, in certain examples, predefined search parameter selection criteria may be provided for use by management facility 102 by an end user of a media service and/or the media content search creation tool. To this end, management facility 102 may provide one or more tools for use by the end user to predefine search parameter selection criteria. For example, management facility 102 may provide a GUI view configured for use by a user to predefine search parameter selection criteria, which may be used by management facility 102 to generate a set of media content search parameters.

Figure 5:
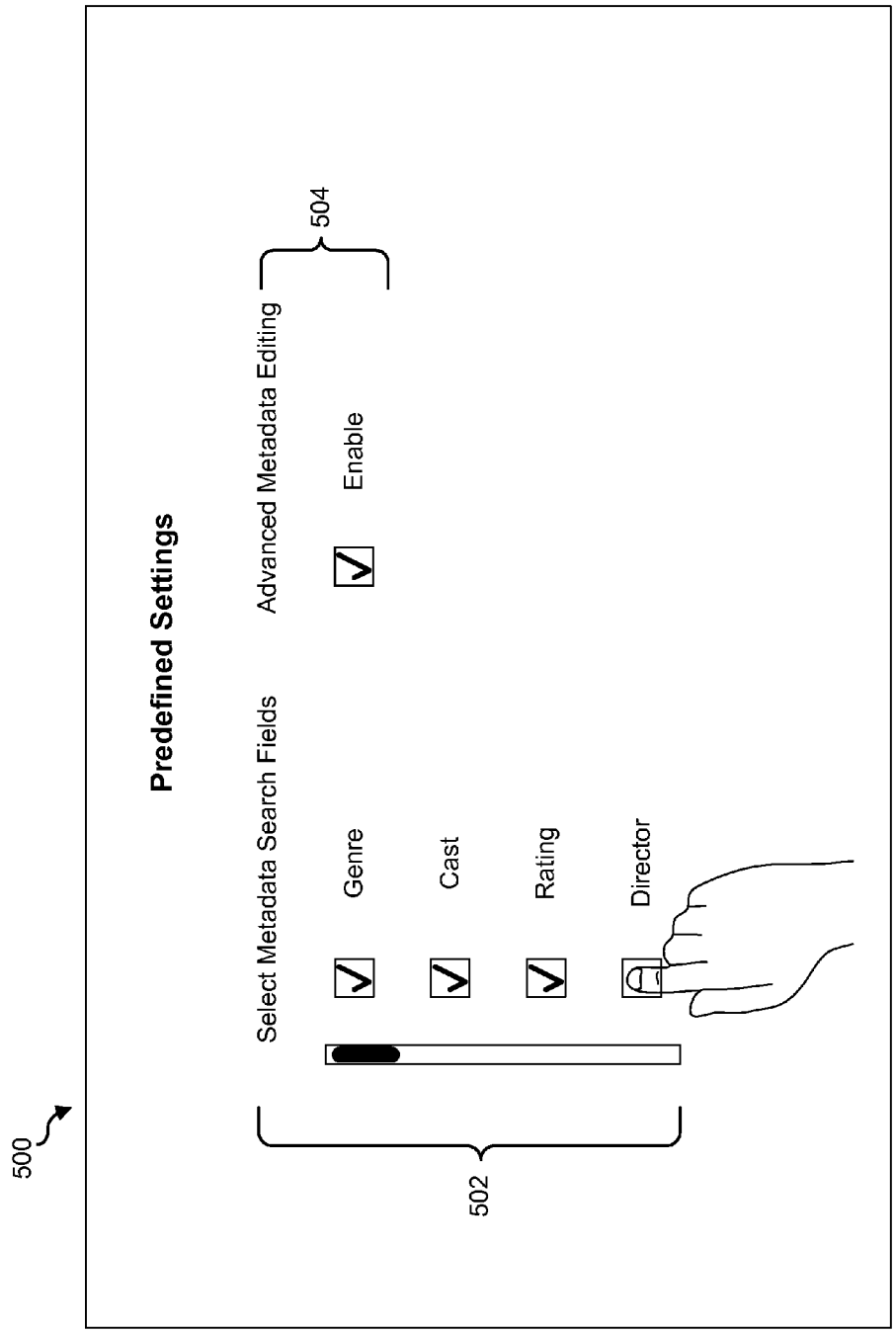

To illustrate, FIG. 5 shows a predefined settings GUI view 500 ("GUI view 500") that may be provided by management facility 102 for display on a display screen of a display device. GUI view 500 may be provided for display in any suitable manner, including as a pop-up window overlaid on any of the GUI views described herein, as a drop-down window included in any of the GUI views described herein, as a separate GUI view, or in any other suitable way.

GUI view 500 may include various user-selectable settings options. For example, GUI view 500 may include one or more user-selectable metadata search field options 502 associated with media metadata fields. In the illustrated example, the metadata search field options 502 include user-selectable options for "genre," "cast," "rating," and "director" metadata fields. A user may provide input (e.g., by providing an appropriate touch gesture on a touchscreen of a display device on which GUI view 500 is displayed) to select or deselect any of the options 502 to cause the selected or deselected options 502 to be included or omitted from predefined search parameter selection criteria to be used by management facility 102 to generate a set of media content search parameters based on one or more media programs submitted to the media content search creation tool. The specific options 502 included in GUI 500 are illustrative only. Any set of user-selectable options may be provided in GUI 500 for use by a user to define search parameter selection criteria to be used by management facility 102 to generate a set of media content search parameters based on one or more media programs submitted to the media content search creation tool.

As shown in FIG. 5, GUI view 500 may include an advanced metadata editing option 504, which may be selected or deselected by a user to enable or disable an advanced metadata editing feature of the media content search creation tool. An example of an advanced metadata editing feature is described herein.

In certain examples, management facility 102 may generate a set of media content search parameters by determining a set of media content metadata based on one or more media programs that have been submitted to the media content search creation tool and generating the set of media content search parameters based on the determined set of media content metadata. This may be performed in any suitable manner. For example, management facility 102 may determine a set of media content metadata in accordance with a search parameter selection heuristic and based on one or more media programs submitted to the media content search creation tool. The search parameter selection heuristic may specify search parameter selection criteria and logic (i.e., a set of rules) configured for use by management facility 102 to determine a set of media content metadata based on one or more media programs submitted to the media content search creation tool. The search parameter selection heuristic may specify any logic and predefined search parameter selection criteria as may suit a particular implementation, including search parameter selection criteria defined by a media content service provider and/or an end user of a media service or the media content search creation tool as described herein.

In certain examples, the search parameter selection heuristic may specify a manner in which management facility 102 uses predefined search parameter selection criteria to determine a set of media content metadata. For example, the search parameter selection heuristic may specify that management facility 102 determines a set of media content metadata by comparing metadata fields associated with the media programs submitted to the media content search creation tool to identify metadata fields that have common (i.e., identical or overlapping) values and using the identified metadata fields having the common values to determine the set of media content metadata, such as by selecting the metadata fields having the common values for inclusion in the determined set of media content metadata.

To provide an example, management facility 102 may detect a submission, by a user, of a first graphical object representing a first media program (e.g., a movie titled "Mission: Impossible") to the media content search creation tool. Subsequently, management facility 102 may detect a user submission of a second graphical object representing a second media program (e.g., a movie titled "Mission: Impossible II") to the media content search creation tool. In accordance with the search parameter selection heuristic, management facility 102 may compare values of metadata fields associated with the first and second media programs submitted to the media content search creation tool, identify one or more metadata fields that have common values, and select one or more of the identified metadata fields that have common values for inclusion in the determined set of media content metadata. For example, by comparing values of metadata fields of the movie titled "Mission: Impossible" with values of metadata fields of the movie titled "Mission: Impossible II," management facility 102 may identify several metadata fields that have common values (e.g., metadata fields that have common values including "genre," "cast," "title," etc.) and include the metadata fields and/or the values of the metadata fields in the determined set of media content metadata. Management facility 102 may then use the determined set of media content metadata to generate a set of media content search parameters based on the first and second media programs submitted to the media content search creation tool.

In certain examples, the search parameter selection heuristic may specify specific metadata fields to be compared by management facility 102 in order to determine a set of media content metadata. For example, the search parameter selection heuristic may specify that management facility 102 compare values of all metadata fields associated with the media programs submitted to the media search creation tool and select those metadata fields having common values for inclusion in the determined set of media content metadata. Alternatively, the search parameter selection heuristic may specify that management facility 102 compare only specific metadata fields (e.g., only metadata fields specified by predefined criteria provided by a service provider and/or end user). For example, the predefined criteria may specify that only specific metadata fields be used by management facility 102 to generate media content search parameters. Accordingly, management facility 102 may compare values for those metadata fields only in order to determine a set of media content metadata to be used to generate the media content search parameters.

In certain examples, the search parameter selection heuristic may specify a prioritization of metadata fields to be used to determine a set of media content metadata. For example, the search parameter selection heuristic may specific metadata fields in a prioritized order (e.g., in descending order of importance). In accordance with the prioritized order specified by the search parameter selection heuristic, management facility 102 may start with the highest priority metadata fields and work downward in priority to compare and select metadata fields for inclusion in the determined set of media content metadata.

In certain examples, the search parameter selection heuristic may specify a maximum number of metadata fields to be included in a determined set of media content metadata. Accordingly, if more than the maximum number of metadata fields have common values, management facility 102 may select which of those metadata fields will be included in the determined set of media content metadata. In certain examples, management facility 102 may make such a selection based on a prioritization of metadata fields specified by the search parameter selection heuristic.

In certain examples, the search parameter selection heuristic may specify a predetermined minimum threshold for use by management facility 102 to determine a set of media content metadata. For example, in accordance with the search parameter selection heuristic, management facility 102 may include only those metadata fields in the determined set of media content metadata that are detected at least a predetermined minimum threshold of times within the metadata associated with the media programs submitted to the media content search creation tool. For example, the search parameter selection heuristic may specify that a metadata field or metadata field value will be included in a determined set of media content metadata only if the metadata field or metadata field value is included in the metadata of the media programs submitted to the media content search creation tool at least a minimum number of times (e.g., in the metadata for each of the media programs submitted to the media content search creation tool, in the metadata for a minimum percentage of the media programs submitted to the media content search creation tool, etc.).

In certain examples, management facility 102 may determine a set of media content metadata based at least in part on input provided by an end user for use by management facility 102. In some examples, the user input may be provided to management facility 102 by way of a GUI configured for use by the end user to submit input to predefine one or more settings options to be used by management facility 102 to determine a set of media content metadata (e.g., settings options such as those shown in FIG. 5). Additionally or alternatively, management facility 102 may provide, after determining a set of media content metadata, a metadata edit tool configured for use by a user to submit input to define (or refine) the determined set of media content metadata to be used to generate a set of media content search parameters.

Figure 6:
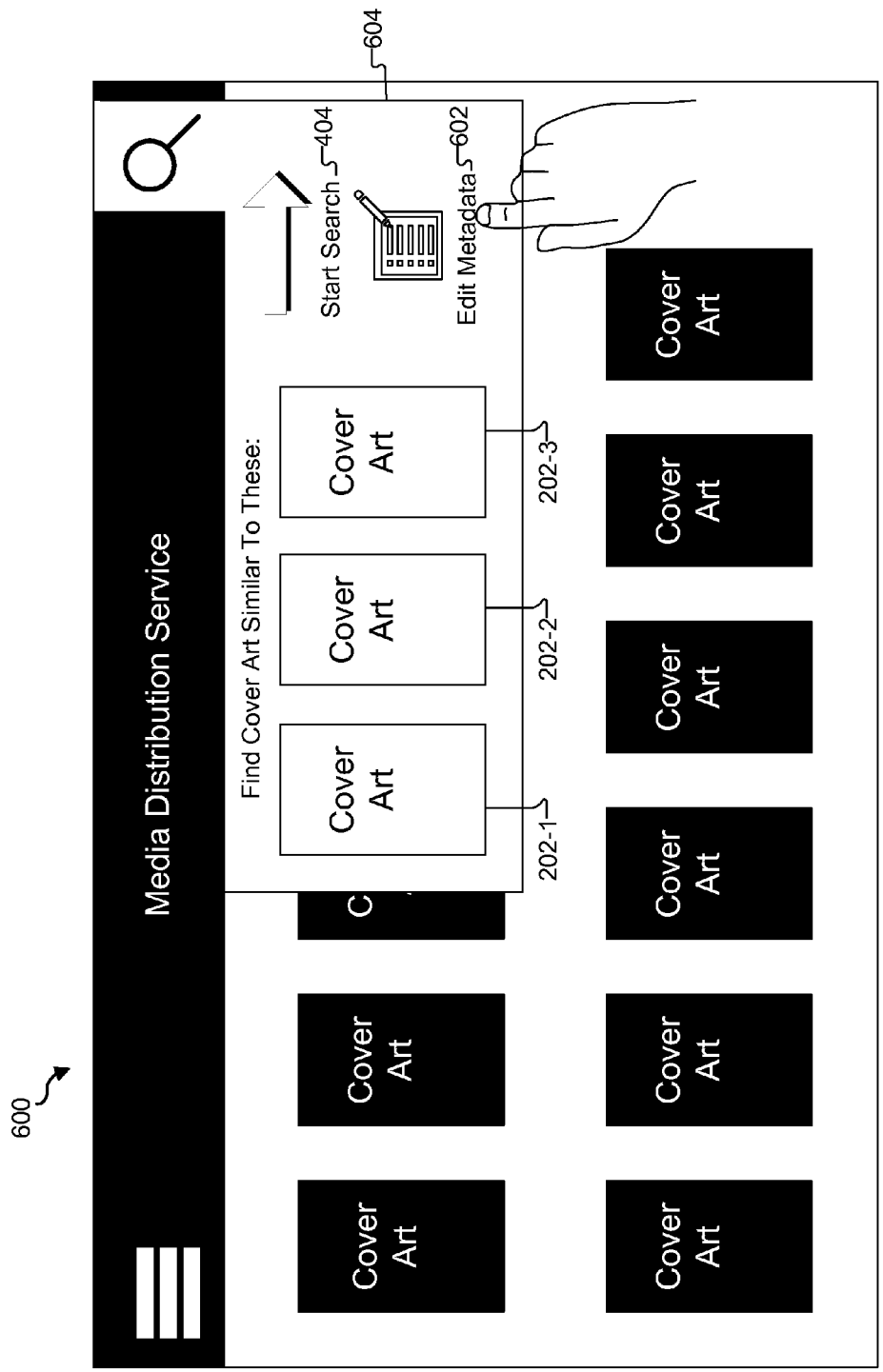

To illustrate, FIG. 6 shows an exemplary GUI view 600 that may be provided by management facility 102 for display on a display screen of a display device. As shown in FIG. 6, GUI view 600 may include an edit metadata option 602 configured to be selected by a user to edit metadata (e.g., one or more metadata fields and/or metadata values) associated with one or more media programs submitted to a media content search creation tool. In some examples, edit metadata option 602 may be included within a drop-down window 604, as shown in FIG. 6. In other examples, edit metadata option 602 may be displayed within a pop-up window overlaid on any of the other GUI views described herein, as a separate GUI view, or in any other suitable way.

In certain examples, edit metadata option 602 may be provided by management facility 102 for display within drop-down window 604 after a user has submitted input to the media content search creation tool in the form of one or more media programs represented by one or more graphical objects (e.g., graphical objects 202-1, 202-2, and 202-3, as shown in FIG. 6). In other examples, management facility 102 may provide the user-selectable edit metadata option 602 for display within drop-down window 604 after a user has provided input to select the start-search option 404 to initiate a search for media content related to one or more media programs submitted to the media content search creation tool.

Management facility 102 may receive user input to select the edit metadata option 602 in any suitable manner (e.g., in response to an appropriate touch gesture on a touchscreen of a display device as described herein) and, in response, may provide a metadata editor feature of the media content search creation tool.

Figure 7:
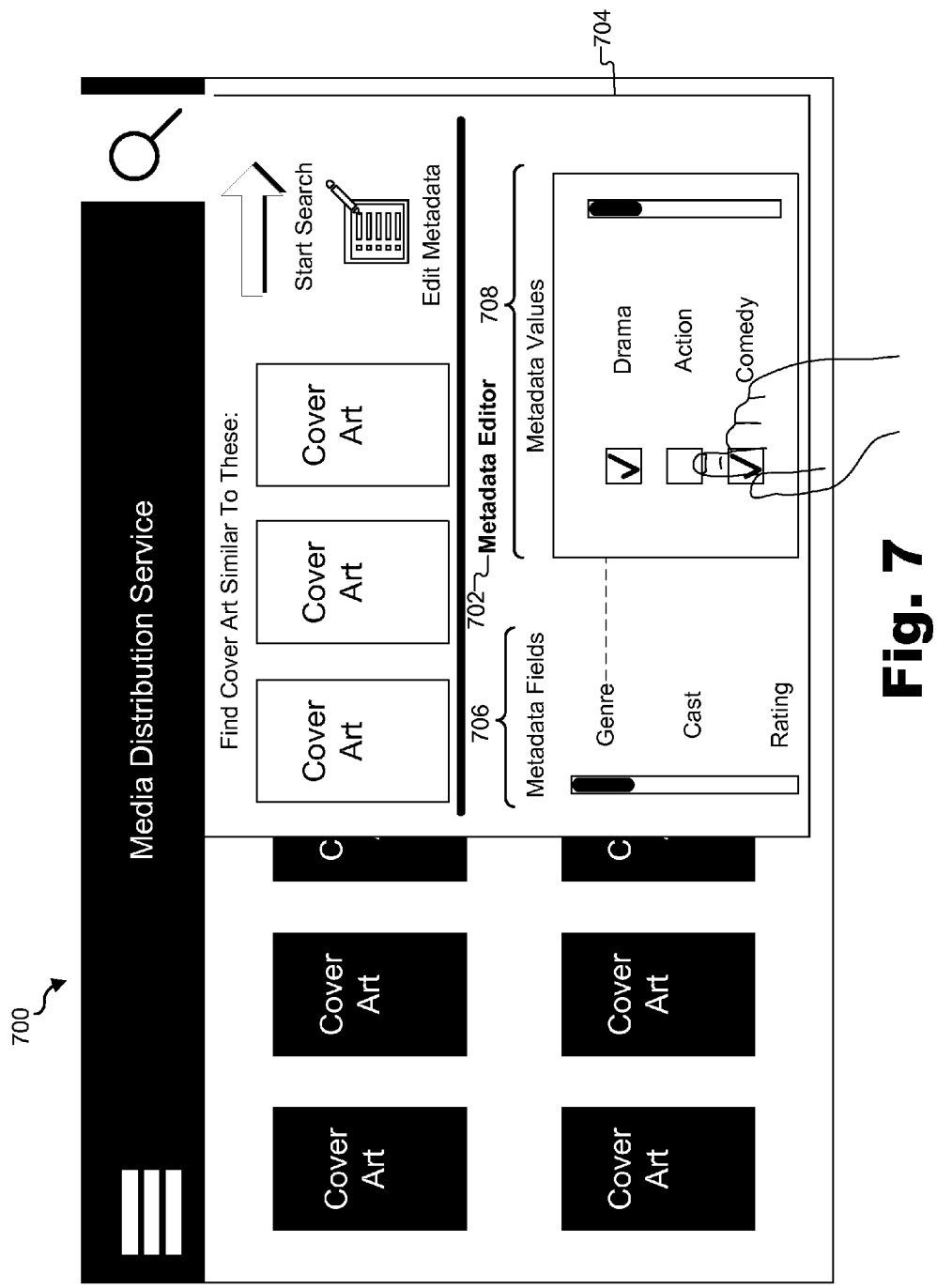

To illustrate an example, management facility 102 may provide an exemplary GUI view 700 for display on a display screen of a display device (e.g., in response to user input that selects edit metadata option 602 in GUI view 600). As shown in FIG. 7, GUI view 700 may include a metadata editor feature 702 ("metadata editor 702") of the media content search creation tool. Metadata editor 702 may be provided for display within a drop-down window 704, or in any other suitable manner.

Metadata editor 702 may be configured for use by a user to submit input to edit one or more metadata fields and/or metadata values associated with one or more media programs submitted to the media content search creation tool. For example, metadata editor 702 may include a listing of one or more metadata fields 706 (e.g., metadata fields including "genre," "cast," and "rating" fields) associated with the media programs represented by graphical objects 202-1, 202-2, and 202-3 submitted to the media content search creation tool. Metadata editor 702 may further include one or more metadata values 708 for each listed metadata field 706. In FIG. 7, for example, metadata editor 702 includes a listing of metadata values (e.g., metadata values including "drama," "action," and "comedy" values) associated with the "genre" metadata field 706. Metadata fields 706 and/or metadata values 708 may be configured to be selected by a user to provide input to management facility 102 to define (or refine) a set of media content metadata. In some examples, the user input may refine a set of media content metadata determined by management facility 102 to create a refined set of media content metadata. Management facility 102 may detect user input to metadata editor 702, determine a refined set of media content metadata based on the input, and generate a set of media content search parameters based on the refined set of media content metadata.

In certain examples, management facility 102 may generate a set of media content search parameters based on information about an end user of the media content search creation tool. The information about the end user may be provided for use by management facility 102 in any suitable manner and may include any suitable information as may serve a particular implementation.

For example, management facility 102 may access stored information about the user (e.g., information stored in storage facility 104, information stored in a remote server accessible to system 100, information stored in a memory of a computing device such as any of the devices described herein, or information stored in any other suitable way and accessible to management facility 102). Additionally or alternatively, management facility 102 may receive user information provided by a media distribution service to which the user subscribes, user information provided by a user device used by the user to access the media content search creation tool, or user information provided by any other suitable source in any suitable manner.

The information accessed and/or provided to management facility 102 about the user may include, without limitation, information such as watch history information (e.g., information including a list of media programs recently accessed and/or consumed by the user), demographics information (e.g., information including a nationality of the user, a current residence location of the user, a gender of the user, etc.), and/or user preferences information (e.g., information including the user's favorite media content genre, favorite actors, favorite directors, etc.). Management facility 102 may use any such information about the user to determine a set of media content metadata and/or to generate a set of media content search parameters.

Media content search parameters generated by management facility 102 may be used to obtain search results (e.g., search results including one or more media programs related to the media content search parameters generated by management facility 102). This may be performed in any suitable manner. As mentioned above, for example, management facility 102 may submit (e.g., transmit data representative of) the generated media content search parameters to a search engine (e.g., a third-party search engine). For instance, management facility 102 may submit the generated set of media content search parameters to one or more search engines configured to use the set of media content search parameters to search for media content (e.g., one or more media programs) related to the set of media content search parameters submitted to the one or more search engines. In response, management facility 102 may receive, from the one or more search engines, data representative of search results (e.g., search results representing one or more media programs related to the set of media content search parameters submitted to the one or more search engines). Management facility 102 may provide the data representative of the search results received from the one or more search engines for display on a display screen of a display device (e.g., within any of the GUI views displayed on a display device as described herein).

Figure 8:
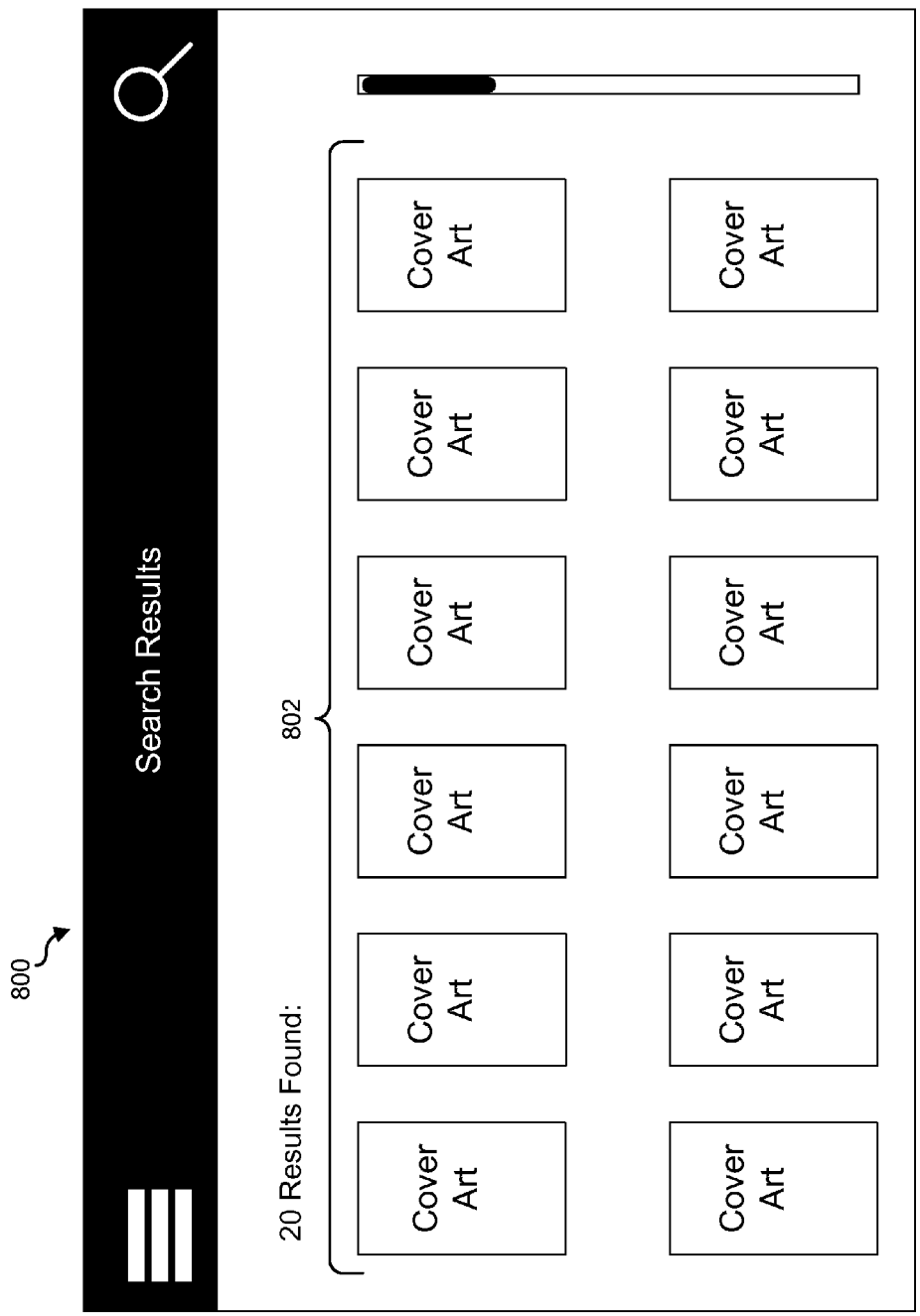

For example, FIG. 8 illustrates an exemplary GUI view 800 that may be provided by management facility 102 for display on a display screen of a display device and that includes GUI content representative of search results received from one or more search engines. As shown, GUI view 800 may include a listing 802 of one or more graphical objects representing one or more media programs included in the search results data received by management facility 102.

Figure 9:
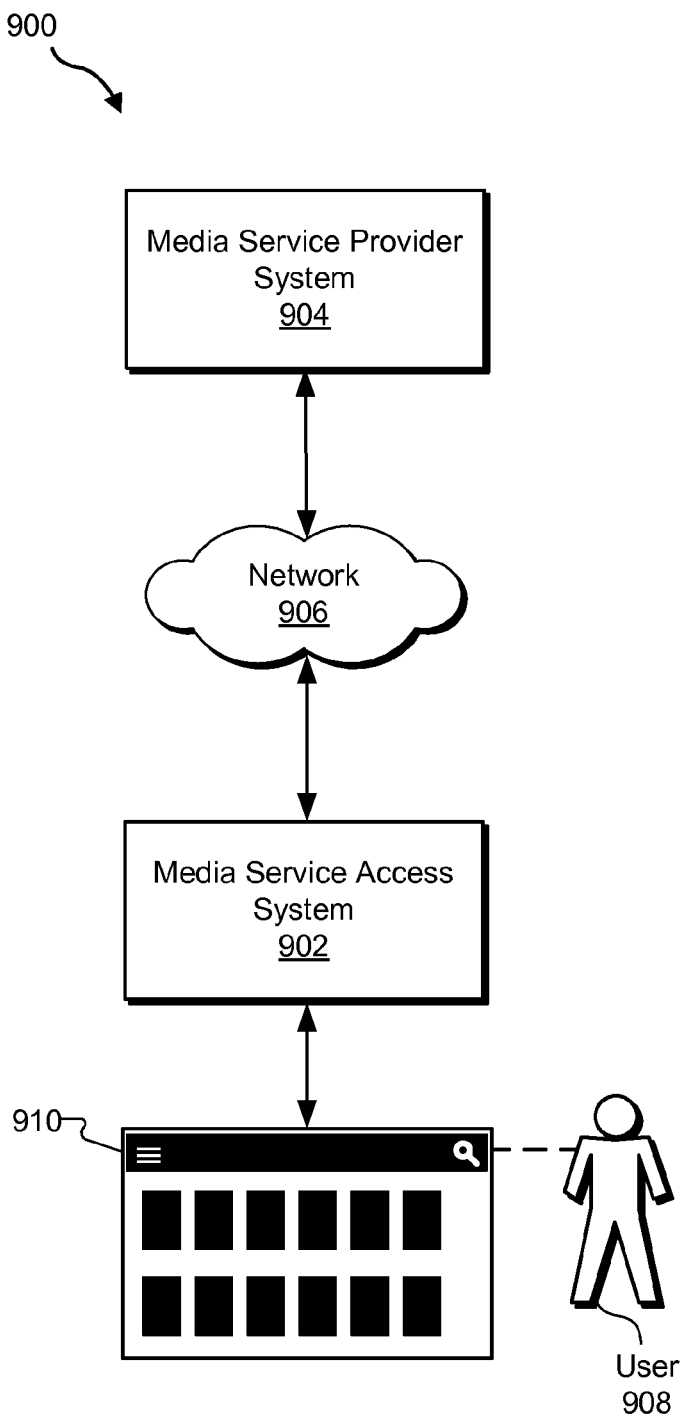
FIG. 9 illustrates an exemplary implementation of the system of FIG. 1 according to principles described herein.

System 100 may be implemented as may suit a particular application. FIG. 9 illustrates an exemplary implementation 900 of system 100. As shown in FIG. 9, implementation 900 may include a media service access system 902 configured to communicate with a media service provider system 904 by way of a network 906. In implementation 900, any of facilities 102 and 104 of system 100 may be implemented entirely by media service access system 902, entirely by media service provider system 904, or distributed across media service access system 902 and media service provider system 904.

Media service provider system 904 and media service access system 902 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Global System for Mobile Communications ("GSM") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), Code Division Multiple Access ("CDMA") technologies, in-band and out-of-band signaling technologies, subscriber and/or proprietary television network communication technologies, and other suitable communications technologies.

Network 906 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, and any other networks capable of carrying media content, data, and/or communications signals between media service access system 902 and media service provider system 904. Communications between media service access system 902 and media service provider system 904 may be transported using any one of the above-listed networks, or any combination or sub-combination of the above-listed networks. Alternatively, media service access system 902 and media service provider system 904 may communicate in another way such as by one or more direct connections between media service access system 902 and media service provider system 904.

Media service provider system 904 may include one or more server-side computing devices. Media service access system 902 may include one or more media content processing devices (e.g., a set-top-box device, DVR device, television, gaming console, personal media player, media server, home media network gateway device, tablet computer, mobile device, etc.) capable of accessing and presenting media content for experiencing by a user 908 (e.g., an end user of a media service) using the device(s).

Media service provider system 904 and/or media service access system 902 may perform one or more operations to provide a media service user interface 910 (e.g., a media browse user interface) for display and use by user 908. Media service user interface 910 may be displayed on any suitable display screen accessible to user 908, including on a display screen of a display device included in media service access system 902 or communicatively connected to media service access system 902. Media service user interface 901 may include any of the exemplary GUI views described herein.

Figure 10:
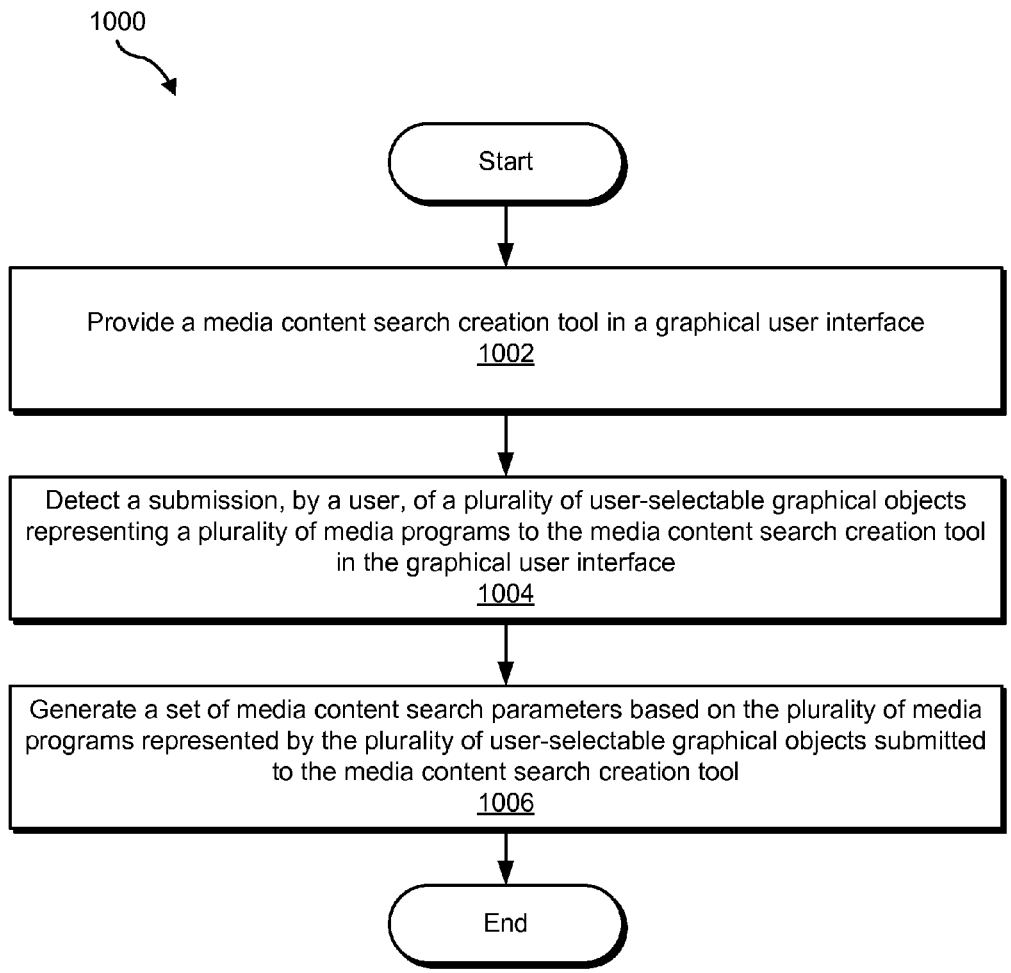
FIG. 10-11 illustrate exemplary media content search methods according to principles described herein.
Figure 11:
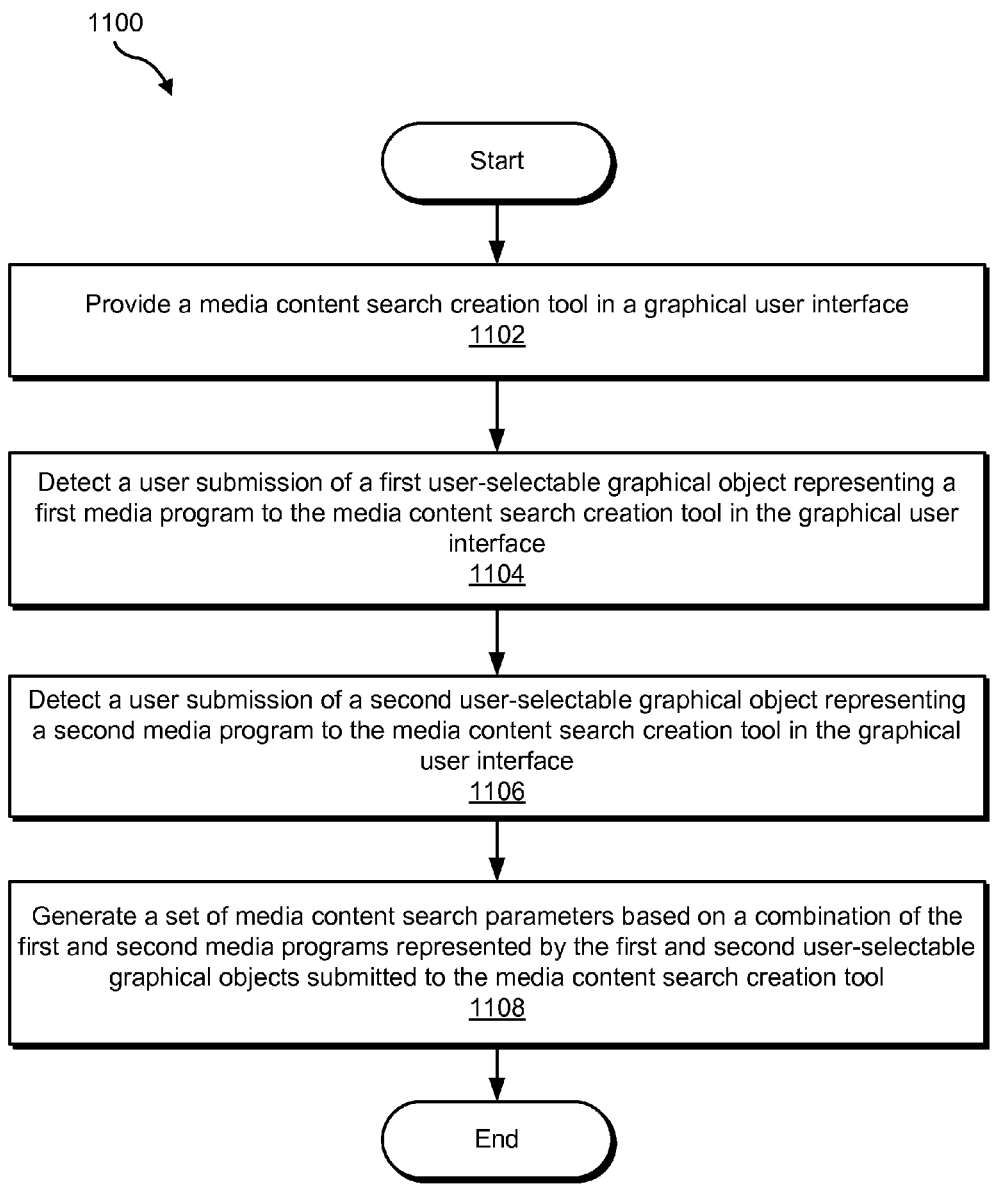

FIGS. 10-11 illustrate exemplary media content search methods 1000 and 1100 according to principles described herein. While FIGS. 10-11 illustrate exemplary methods according to certain embodiments, other embodiments may omit, add to, reorder, combine, and/or modify any of the steps shown in FIGS. 10-11. In certain embodiments, one or more of the steps shown in FIGS. 10-11 may be performed by system 100 and/or one or more components or implementations of system 100.

Turning to method 1000 illustrated in FIG. 10, in step 1002, a system (e.g., system 100) provides a media content search creation tool in a graphical user interface, such as described herein.

In step 1004, the system detects a submission, by a user, of a plurality of user-selectable graphical objects representing a plurality of media programs to the media content search creation tool in the graphical user interface, such as described herein.

In step 1006, the system generates a set of media content search parameters based on the plurality of media programs represented by the plurality of user-selectable graphical objects submitted to the media content search creation tool, such as described herein.

Turning to method 1100 illustrated in FIG. 11, in step 1102, a system (e.g., system 100) provides a media content search creation tool in a graphical user interface, such as described herein.

In step 1104, the system detects a user submission of a first user-selectable graphical object representing a first media program to the media content search creation tool in the graphical user interface, such as described herein.

In step 1106, the system detects a user submission of a second user-selectable graphical object representing a second media program to the media content search creation tool in the graphical user interface, such as described herein.

In step 1108, the system generates a set of media content search parameters based on a combination of the first and second media programs represented by the first and second user-selectable graphical objects submitted to the media content search creation tool, such as described herein. The combination of the first and second media programs may be any combination of the first and second media programs determined by the system. For example, the combination may be a set of media content metadata determined by the system for the first and second media programs.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include any number of computing devices, and may employ and/or interface with any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 12:
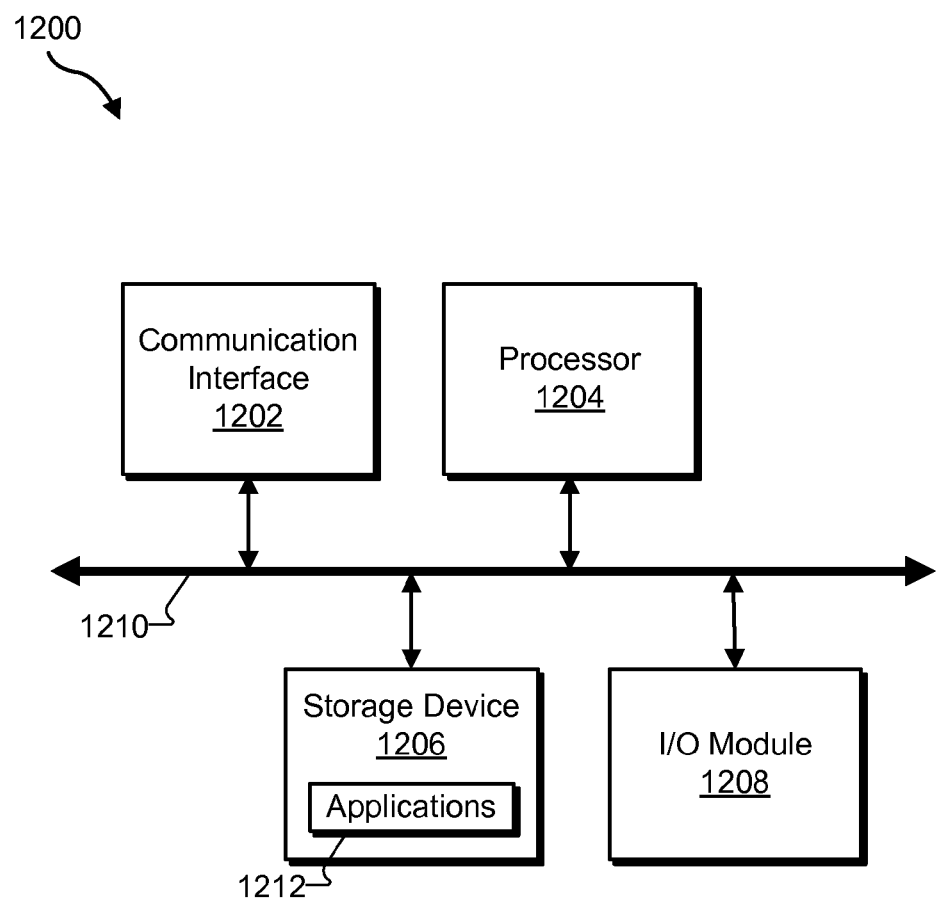
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a communications medium interface, a modem, and any other suitable interface. Communication interface 1202 may be configured to interface with any suitable communication media, protocols, and formats, including any of those mentioned above.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, system 100 or one or more components of system 100 are implemented by or within one or more components of computing device 1200. For example, one or more applications 1212 residing within storage device 1206 may be configured to direct processor 1204 to perform one or more processes or functions associated with media content search management facility 102. Likewise, storage facility 104 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    providing, by a media content search system, a media content search creation tool in a graphical user interface;
    detecting, by the media content search system, that a plurality of user-selectable graphical objects each representing a particular media program within a plurality of media programs have been submitted by a user to the media content search creation tool in the graphical user interface; and
    generating, by the media content search system, a set of media content search parameters configured to be submitted to a search engine to obtain search results relating to the media content search parameters, the media content search parameters generated based on the plurality of media programs represented by the plurality of user-selectable graphical objects submitted to the media content search creation tool, the generating of the set of media content search parameters comprising:
        determining, in accordance with a search parameter selection heuristic and based on the plurality of media programs represented by the plurality of user-selectable graphical objects submitted to the media content search creation tool, a set of media content metadata,
        providing, after the determining of the set of media content metadata, a metadata edit tool in the graphical user interface,
        detecting user input submitted by way of the metadata edit tool to refine the set of media content metadata, and
        generating the set of media content search parameters based on the refined set of media content metadata.

2. The method of claim 1, wherein the generating of the set of media content search parameters is further based on search parameter selection criteria predefined by a media content service provider that provides a media content distribution service, the search parameter selection criteria indicative of particular media content metadata used by the media content search system to generate the set of media content search parameters.

3. The method of claim 1, wherein the generating of the set of media content search parameters is further based on search parameter selection criteria predefined by an end user of the media content search creation tool, the search parameter selection criteria indicative of particular media content metadata used by the media content search system to generate the set of media content search parameters.

4. The method of claim 1, wherein the determining of the set of media content metadata comprises:
    comparing metadata fields associated with the plurality of media programs represented by the plurality of user-selectable graphical objects submitted to the media content search creation tool; and
    selecting one or more of the metadata fields that have common values for inclusion in the determined set of media content metadata.

5. The method of claim 1, wherein the generating of the set of media content search parameters is further based on information about an end user of the media content search creation tool.

6. The method of claim 5, wherein the information about the end user of the media content search creation tool comprises at least one of watch history information, demographic information, and preference information of the end user.

7. The method of claim 1, further comprising:
    submitting, by the media content search system, the set of media content search parameters to the search engine, wherein the search engine is configured to use the set of media content search parameters to search for media programs related to the set of media content search parameters.

8. The method of claim 7, further comprising:
    receiving, by the media content search system from the search engine, data representative of one or more media programs related to the set of media content search parameters; and
    providing, by the media content search system, for display on a display screen, a graphical representation of the data received from the search engine.

9. The method of claim 1, embodied as computer-executable instructions on at least one non-transitory computer-readable medium.

10. A method comprising:
    providing, by a media content search system, a media content search creation tool in a graphical user interface;
    detecting, by the media content search system, that a first user-selectable graphical object representing a first media program has been submitted by a user to the media content search creation tool in the graphical user interface;
    detecting, by the media content search system, that a second user-selectable graphical object representing a second media program has been submitted by the user to the media content search creation tool in the graphical user interface; and
    generating, by the media content search system, a set of media content search parameters configured to be submitted to a search engine to obtain search results relating to the media content search parameters, the media content search parameters generated based on a combination of the first and second media programs represented by the first and second user-selectable graphical objects submitted by the user to the media content search creation tool, the generating of the set of media content search parameters comprising:
        determining, in accordance with a search parameter selection heuristic and based on the first and second media programs represented by the first and second user-selectable graphical objects submitted to the media content search creation tool, a set of media content metadata;

providing, after the determining of the set of media content metadata, a metadata edit tool in the graphical user interface;

detecting user input submitted by way of the metadata edit tool to refine the set of media content metadata; and generating the set of media content search parameters based on the refined set of media content metadata.

11. The method of claim 10, wherein the generating of the set of media content search parameters is further based on at least one of:

a set of search parameter selection criteria predefined by a media content service provider that provides a media content distribution service; and a set of search parameter selection criteria predefined by an end user of the media content search creation tool;

wherein the search parameter selection criteria are indicative of particular media content metadata used by the media content search system to generate the set of media content search parameters.

12. The method of claim 10, wherein the generating of the set of media content search parameters is further based on information about an end user of the media content search creation tool.

13. The method of claim 12, wherein the information about the end user of the media content search creation tool comprises at least one of watch history information, demographic information, and preference information of the end user.

14. The method of claim 10, further comprising:

submitting, by the media content search system, the set of media content search parameters to the search engine, wherein the search engine is configured to use the set of media content search parameters to search for media programs related to the set of media content search parameters.

15. The method of claim 14, further comprising:

receiving, by the media content search system from the search engine, data representative of one or more media programs related to the set of media content search parameters; and providing, by the media content search system, for display on a display screen, a graphical representation of the data received from the search engine.

16. The method of claim 10, embodied as computer-executable instructions on at least one non-transitory computer-readable medium.

17. A system comprising:

at least one physical computing device that:

provides a media content search creation tool in a graphical user interface;

detects that a plurality of user-selectable graphical objects each representing a particular media program within a plurality of media programs have been submitted by a user to the media content search creation tool in the graphical user interface; and generates a set of media content search parameters configured to be submitted to a search engine to obtain search results relating to the media content search parameters, the media content search parameters generated based on the plurality of media programs represented by the plurality of user-selectable graphical objects submitted to the media content search creation tool;

wherein the at least one physical computing device generates the set of media content search parameters by:

determining, based on the plurality of user-selectable graphical objects representing a plurality of media programs submitted to the media content search creation tool, a set of media content metadata;

providing, after the determining of the set of media content metadata, a metadata edit tool in the graphical user interface;

detecting user input submitted by way of the metadata edit tool to refine the set of media content metadata; and generating the set of media content search parameters based on the refined set of media content metadata.

18. The system of claim 17, wherein the set of media content search parameters is generated further based on at least one of:

a set of search parameter selection criteria predefined by a media content service provider that provides a media content distribution service; and a set of search parameter selection criteria predefined by an end user of the media content search creation tool;

wherein the search parameter selection criteria are indicative of particular media content metadata used by the media content search system to generate the set of media content search parameters.

19. The system of claim 17, wherein the at least one physical computing device generates the set of media content search parameters further based on information about an end user of the media content search creation tool.

20. The system of claim 19, wherein the information about the end user of the media content search creation tool comprises at least one of watch history information, demographic information, and preference information of the end user.

21. The system of claim 17, wherein the at least one physical computing device further:

submits the set of media content search parameters to the search engine, wherein the search engine is configured to use the set of media content search parameters to search for media programs related to the set of media content search parameters;

receives data representative of one or more media programs related to the set of media content search parameters from the search engine; and provides, for display on a display screen, a graphical representation of the data received from the search engine.

* * * * *